(12) United States Patent
Rivera

(10) Patent No.: US 8,205,544 B2
(45) Date of Patent: Jun. 26, 2012

(54) AUTOMATIC JUICER

(76) Inventor: Adrian Rivera, Whittier, CA (US)

( * ) Notice: Subject to any disclaimer, the term of this patent is extended or adjusted under 35 U.S.C. 154(b) by 435 days.

(21) Appl. No.: 12/610,199

(22) Filed: Oct. 30, 2009

(65) Prior Publication Data

US 2010/0058940 A1   Mar. 11, 2010

Related U.S. Application Data

(63) Continuation-in-part of application No. 12/206,964, filed on Sep. 9, 2008, and a continuation-in-part of application No. 12/406,314, filed on Mar. 18, 2009, and a continuation-in-part of application No. 12/550,232, filed on Aug. 28, 2009.

(51) Int. Cl.
  A47J 19/02   (2006.01)
  A47J 43/14   (2006.01)
  A23N 1/00   (2006.01)

(52) U.S. Cl. .................. 99/502; 99/504; 99/501

(58) Field of Classification Search .......... 99/501, 99/502, 503, 504, 507
  See application file for complete search history.

(56) References Cited

U.S. PATENT DOCUMENTS

| 1,634,774 | A  | * | 7/1927  | Enssle .............................. 99/502 |
| 6,138,556 | A  | * | 10/2000 | Yu et al. .......................... 99/504 |
| 6,186,057 | B1 | * | 2/2001  | Cremades Del Toro ........ 99/503 |
| 8,082,841 | B2 | * | 12/2011 | Horche Trueba et al. ...... 99/502 |
| 2006/0107776 | A1 | * | 5/2006 | Minnig et al. .................... 74/25 |
| 2006/0169152 | A1 | * | 8/2006 | Lin et al. .......................... 99/495 |
| 2008/0197329 | A1 | * | 8/2008 | Brechelente .................... 254/98 |

* cited by examiner

*Primary Examiner* — Reginald L Alexander
(74) *Attorney, Agent, or Firm* — Kenneth L. Green

(57) ABSTRACT

An automatic juicer turns and pushes an upward facing juicing cone into a fruit for releasing juice. The juicer includes a base containing a motor, gear and shaft assembly. A fixed guide extends upward from the base and inner and outer shafts reside inside the fixed guide and are driven by the motor and gear assembly to rotate and advance the juicing cone into the fruit. The inner shaft includes threads to vertically advance and retreat a shaft nut and the outer shaft rotates with the inner shaft, but is lifted by the shaft nut when the inner shaft turns. The juicing cone releases the juice and a stationary bowl catches the juice.

19 Claims, 8 Drawing Sheets

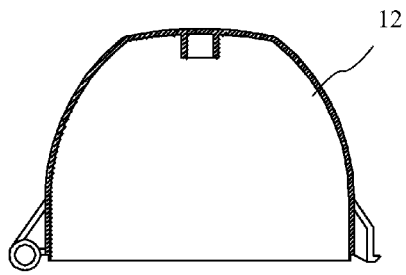
FIG. 4A
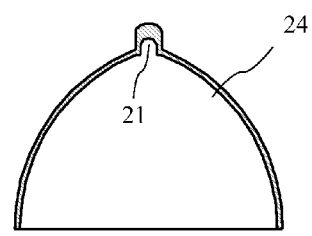
FIG. 4B
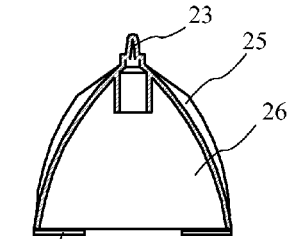
FIG. 4C
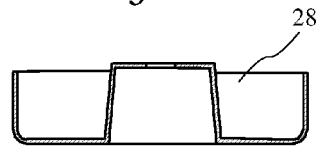
FIG. 4D
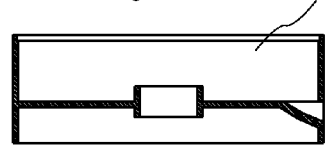
FIG. 4E
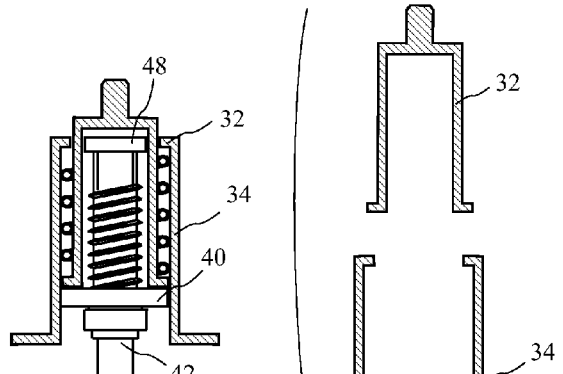
FIG. 5A
FIG. 5B
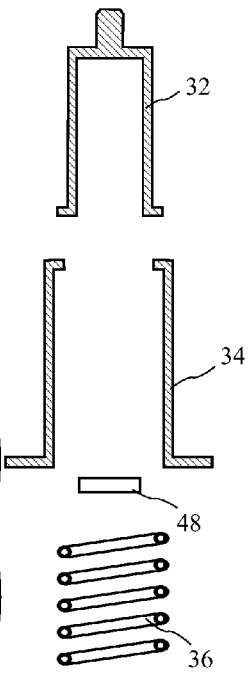
FIG. 6

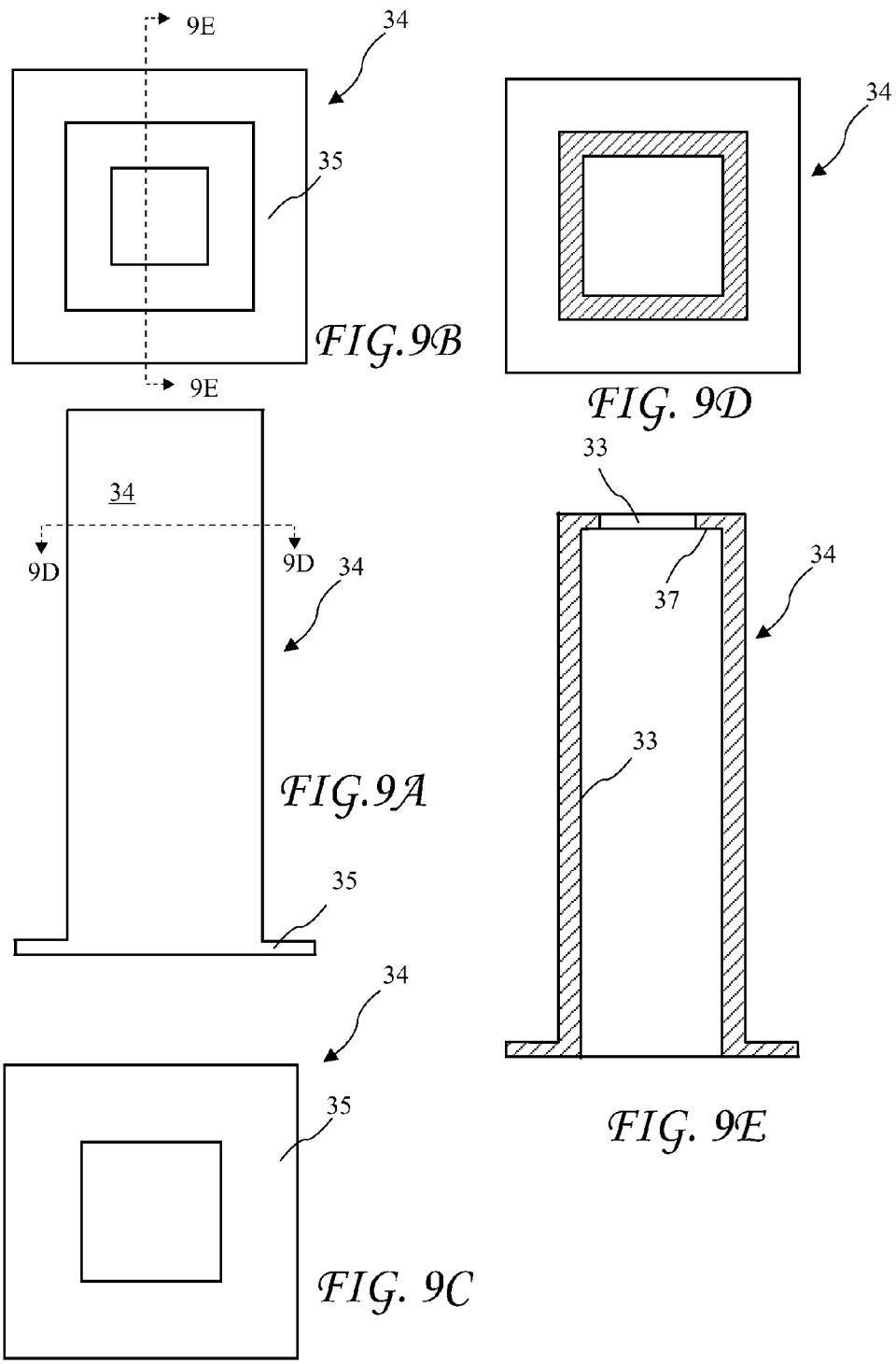

AUTOMATIC JUICER

The present application is a Continuation In Part of U.S. patent application Ser. No. 12/206,964 filed Sep. 9, 2008, U.S. patent application Ser. No. 12/406,314 filed Mar. 18, 2009, and U.S. patent application Ser. No. 12/550,232 filed Aug. 28, 2009 which applications are incorporated in their entirety herein by reference.

BACKGROUND OF THE INVENTION

The present invention relates to juice extractors and in particular to electric juice extractors.

Juice extractors are commonly used to extract juice from, for example, oranges. Known manual juice extractors comprise a bowl with a raised conical ridged center, called a juicing cone. A user cuts a fruit in half, and pushes and rotates the exposed cut side down over the juicing cone. The juice is thereby released into the bowl.

Manual juice extractors have been largely replaced by electric juicers. Various electric juicers exist, including centrifugal juicers which include blades and spins to separate the juice from pulp, masticating which grinds and then squeezes the juice from the pulp, and simple citrus juicers which resemble a manual juicer but include an electric motor to rotate the juicing cone.

While the known juicers are often satisfactory, users still desire a simple automatic juicer which is not as rough on the fruit as the centrifugal or masticating juicers, but does not require the users to manually push the fruit on the electrically turned juicing cone. U.S. patent application Ser. No. 12/206,964 filed Sep. 9, 2008, U.S. patent application Ser. No. 12/406,314 filed Mar. 18, 2009, and U.S. patent application Ser. No. 12/550,232 filed Aug. 28, 2009 by the present applicant discloses automated juicers providing many of the benefits desired, however, further development resulted in an alternative embodiment which simplifies manufacturing.

BRIEF SUMMARY OF THE INVENTION

The present invention addresses the above and other needs by providing an automatic juicer which turns and pushes an upward facing juicing cone into a fruit for releasing juice. The juicer includes a base containing a motor, gear and shaft assembly. A fixed guide extends upward from the base and inner and outer shafts reside inside the fixed guide and are driven by the motor and gear assembly to rotate and advance the juicing cone into the fruit. The inner shaft includes threads to vertically advance and retreat a shaft nut and the outer shaft rotates with the inner shaft, but is lifted by the shaft nut when the inner shaft turns. The juicing cone releases the juice and a stationary bowl catches the juice.

In accordance with one aspect of the invention, there is provided an automatic juicer. The juicer includes a base, a lid attached to the base and openable to allow fruit to be placed in the juicer; a center column assembly attached to the base and including a collet fixed to the base and having internal threads, and a motor, gear and shaft mechanism inside the juicer and advancing and retreating vertically as a unit. The motor, gear and shaft mechanism includes a motor in the base, a gear set in the base and engaging the motor, and a shaft assembly extending above the base. The shaft assembly includes an outer shaft threadably engaging the collet for vertically advancing and retreating when turned by the motor through the gear set, and an inner shaft rotating inside the outer shaft and advancing and retreating vertically with the outer shaft. An upward facing juicing cone is attached to the inner shaft and rotates and advances vertically with the inner shaft into a fruit. A bowl resides under the juicing cone and is attached to the base. The juicing cone thereby rotates and pushes into a fruit for releasing juice from the fruit to be caught in the bowl.

In accordance with another aspect of the invention, there is provided an automatic juicer. The juicer includes a base containing a motor and a gear set engaging the motor. A lid is attached to the base and is openable to allow fruit to be placed in the juicer. A center column assembly is attached to the base and includes a collet fixed to the base. An outer shaft threadably engages the collet and vertically advances and retreats when turned by the motor through the gear set. An inner shaft rotates with the outer shaft and advances and retreats vertically with the outer shaft when turned by the motor. A bowl is attached to the base and an upward facing juicing cone is attached to the inner shaft and rotates and advances vertically with the inner shaft, rotating and pushing into a fruit for releasing juice from the fruit to be caught in the bowl. A non-rotating strainer advances and retreats vertically with the juicing cone and knife edges on a bottom surface of the juicing cone clear pulp blocking the strainer.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 4A is a cross-sectional view of the lid of the juicer.

FIG. 4B is a cross-sectional view of a fruit holder, according to the present invention, of the juicer.

FIG. 4C is a cross-sectional view of the juicing cone, according to the present invention, of the juicer.

FIG. 4D is a cross-sectional view of a strainer, according to the present invention, of the juicer.

FIG. 4E is a cross-sectional view of a bowl, according to the present invention, of the juicer.

FIG. 5A is a cutaway view of a center column assembly of the juicer according to the present invention in the down position.

FIG. 5B is a cutaway view of the center column assembly of the juicer according to the present invention in the up position.

FIG. 6 is an exploded view of the center column assembly, according to the present invention, of the juicer.

FIG. 9A is a side view of an outer column, according to the present invention, of the center column of the juicer.

FIG. 9B is a top view of the outer column, according to the present invention, of the center column of the juicer.

FIG. 9C is a bottom view of the outer column, according to the present invention, of the center column assembly of the juicer.

FIG. 9D is a cross-sectional view of the outer column taken along line 9D-9D of FIG. 9A.

FIG. 9E is a cross-sectional side view of the outer column taken along line 9E-9E of FIG. 9C.

FIG. 12D is a side cross-sectional view of the outer shaft of the center column assembly of the juicer taken along line 12D-12D of FIG. 12a.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1B:
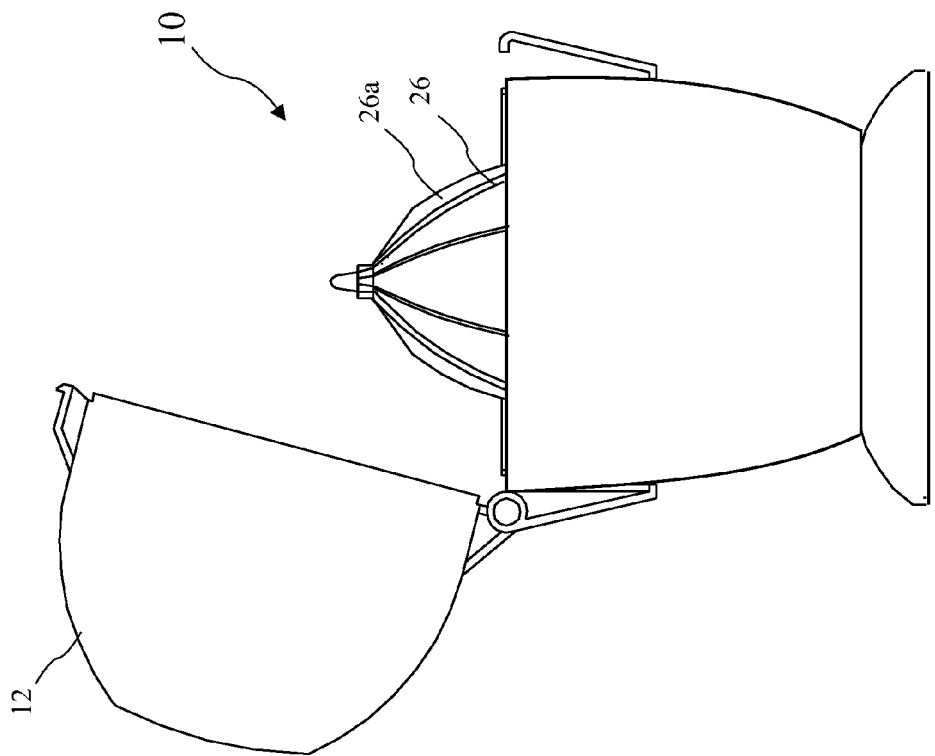
FIG. 1B is the juicer according to the present invention with an open lid.
Figure 1A:
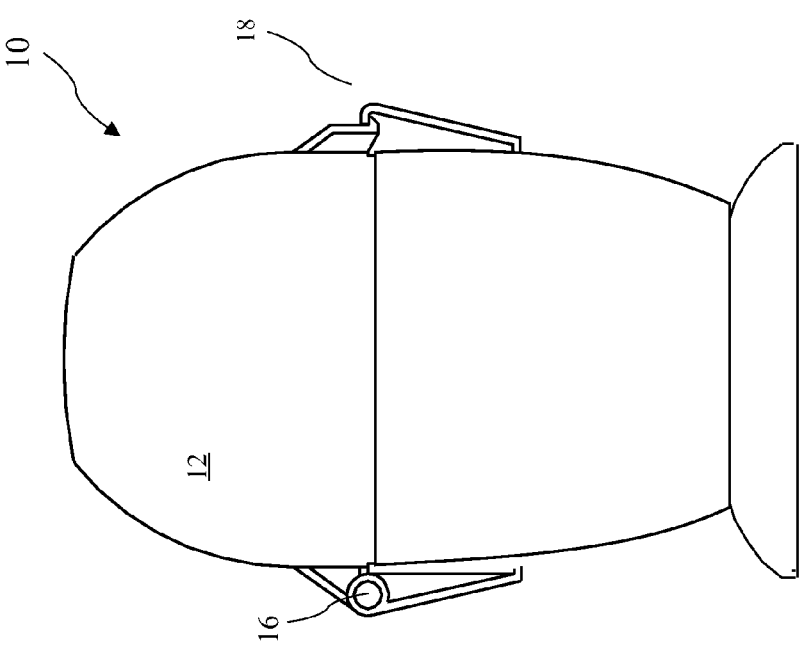
FIG. 1A is a juicer according to the present invention with a closed lid.

A juicer 10 according to the present invention is shown with a lid 12 closed in FIG. 1A and with the lid 12 open exposing a juicing cone 16 in FIG. 1B. The lid 12 pivots at hinge 16 and is held closed by latch 18. A half fruit may be placed over the juicing cone 26 and the lid 12 closed to operate the juicer 10.

Figure 2:
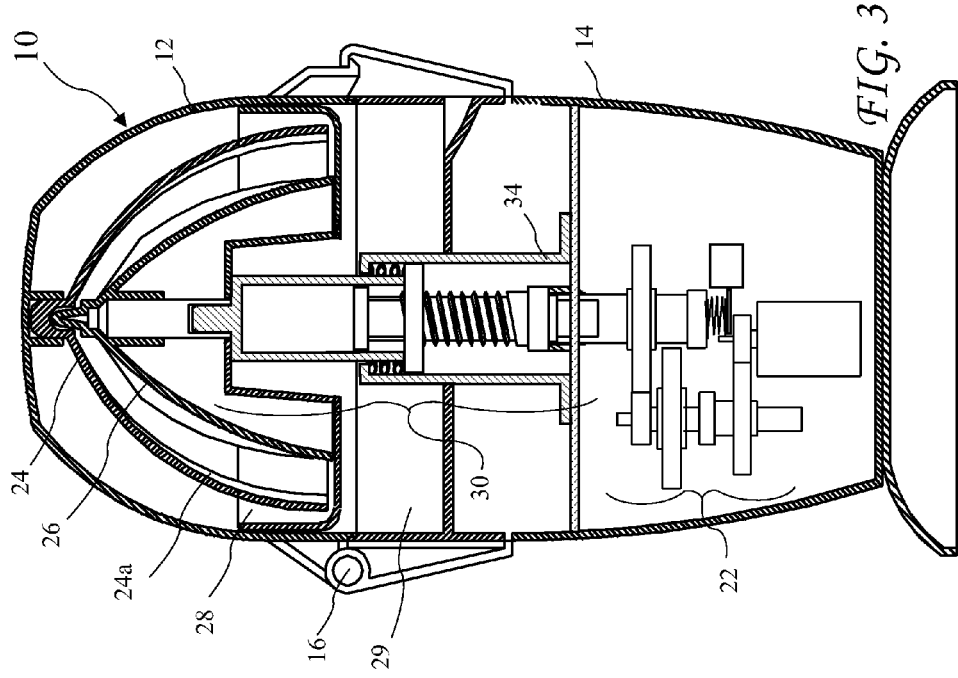
FIG. 2 is a cross-sectional view of the juicer according to the present invention with a juicing cone in a down position and the lid closed.
Figure 3:
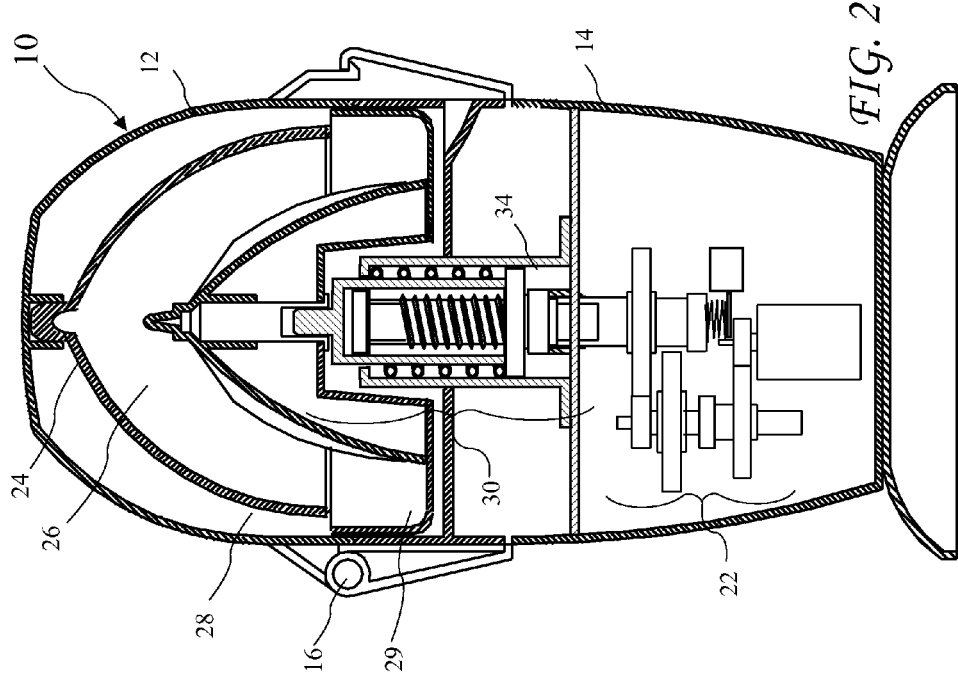
FIG. 3 is a cross-sectional view of the juicer according to the present invention with the juicing cone in an up position and the lid closed.

A cross-sectional view of the juicer 10 with the juicing cone 26 in a down position and the lid 12 closed is shown in FIG. 2, and a cross-sectional view of the juicer 10 with a juicing cone in an up position and the lid 12 closed is shown in FIG. 3. The hinge 16 connects the lid 12 to the base 14, and the latch 18 holds the lids 12 closed during operation of the juicer 10. The fruit holder 24 includes anti-slip elements on the inside fruit surface to prevent the fruit from rotating inside the fruit holder 24 during operation of the juicer. The anti-slip elements may be spikes, ridges or the like, for example ridges 24a.

Figures 15A, 15B:
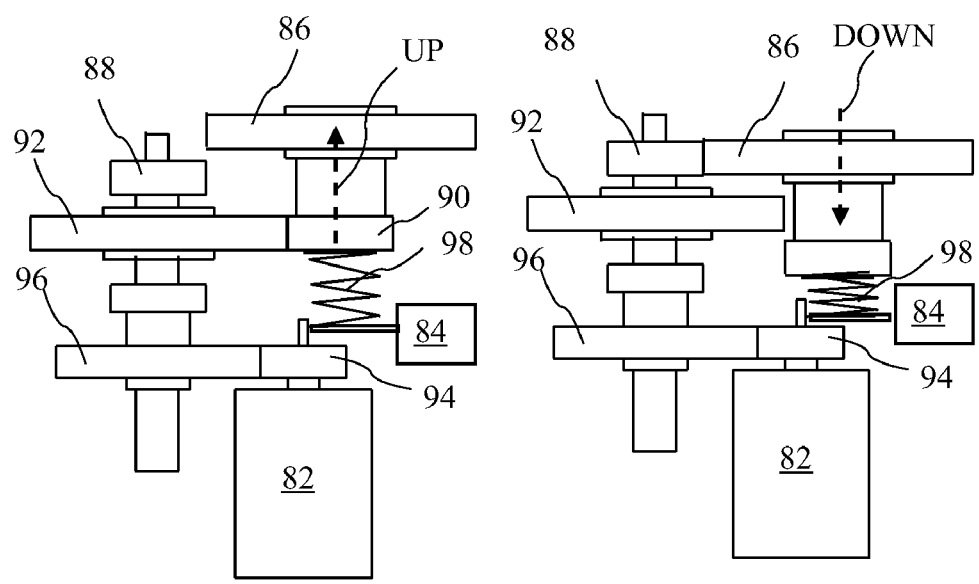
FIG. 15A shows a clutch and gearing assembly according to the present invention in a high speed position.
FIG. 15B shows the clutch and gearing assembly according to the present invention in a high torque position.

The juicer 10 includes a base 14 housing a motor 20 and a gearing assembly 22 (see FIGS. 15A and 15B for details). The motor 20 may be manually controlled by a user to operate in a first direction to raise the juicing cone against fruit for about five seconds and then manually controlled to lower the juicing cone, or may be automated to raise the juicing cone against fruit for about five seconds and then automatically reverse. The motor 20 and the gearing assembly 22 may alternatively be controlled by measuring the vertical force of the juicing cone against the fruit, and the motor direction reversed when the force reaches a predetermined level.

The juicer 10 includes a fruit holder 24, the juicing cone 26, a strainer 28, and a bowl 29. The fruit holder 24 is fixed inside the lid 12 and opens with the lid 12. The juicing cone 26 includes ridges 25 (see FIG. 4C) and rises into the fruit and rotates. The ridges 25 cut into the pulp of the fruit to release fruit juice and the rising juicing cone 26 compresses the pulp to further release the juice. The strainer 28 resides under the juicing cone 26 and rises with the juicing cone 26 but does not rotate. The bowl 29 is fixed to the base 14 and does not rise or rotate, and catches the juice released from the fruit.

A cross-sectional view of the lid 12 of the juicer 10 is shown in FIG. 4A, a cross-sectional view of the fruit holder 24, according to the present invention, of the juicer 10 is shown in FIG. 4B, a cross-sectional view of the juicing cone 26, according to the present invention, of the juicer 10 is shown in FIG. 4C, a cross-sectional view of a strainer 28, according to the present invention, of the juicer 10 is shown in FIG. 4D, and a cross-sectional view of a bowl 29, according to the present invention, of the juicer 10 is shown in FIG. 4E. The upward facing face of the juicing cone 26 includes the ridges 25 for cutting into the pulp of the fruit and a lower end of the juicing cone 26 includes blades (or scrapers) 27 which scrape against a top surface of the strainer 28 to prevent pulp from blocking the strainer 28 during use. The fruit holder 24 includes a seat 21 for limiting upward movement of the juicing cone 26, and the juicing cone 26 includes a stop 23 for cooperation with the seat 21.

A cutaway view of a center column assembly 30 of the juicer 10 is shown in the down position in FIG. 5A and in the up position in FIG. 5B, and an exploded view of a center column assembly 30 according to the present invention of the juicer 10 is shown in FIG. 6. The center column assembly 30 includes a rotating and vertically translating outer shaft 32, a stationary (non-rotating and non-translating) outer column 34 attached to the base 14 (see FIG. 1), a spring 36, a lifting nut 40, an inner shaft 42 and a guide 48. The outer shaft 32 lifts and rotates the juicing cone 26. The spring 36 resides inside the outer column 34 and provides downward force on the outer shaft 32 and/or the lifting nut 40 to bias the outer shaft 32 towards a down position (see FIGS. 2-4). The outer shaft 32 resides outside the inner shaft 42 and is guided by the guide 48 or keyed to rotate with the inner shaft 42 but free to vertically translate. The lifting nut 40 is threaded into the exterior of the inner shaft 42 and is shaped (e.g., is rectangular, square, oval, elliptical or any shape other than round) to prevent the lifting nut 40 from rotating with the inner shaft 42. A smooth portion 42' at the top of the inner shaft 42 may be provided to allow the lifting nut 40 to disengage from threads 43 of the inner shaft 42 at maximum vertical extension until the rotation of the inner shaft 42 is reversed. The inner shaft 42 is attached to pears 86 and 90 (see FIG. 15A).

Figure 7:
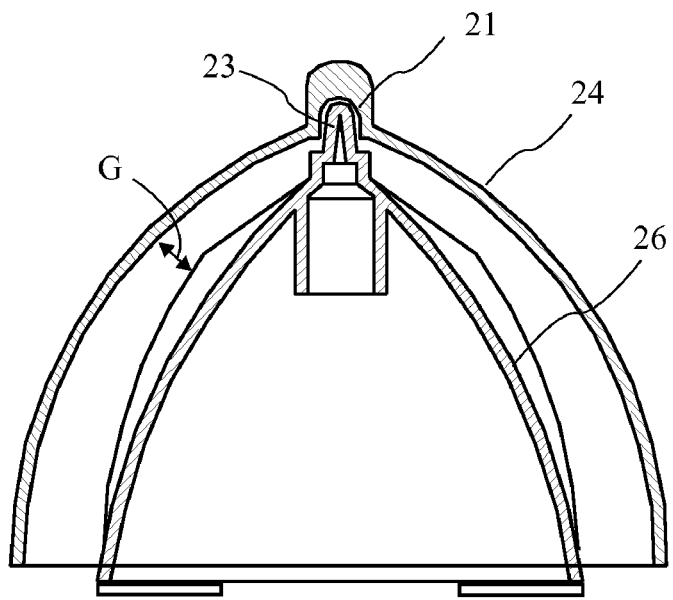
FIG. 7 shows a vertical stop according to the present invention.

A vertical stop according to the present invention is shown in FIG. 7. The juicing cone 26 includes a stop 23 at the peak of the cone, and the fruit holder 24 includes a seat 21 above the stop 23. The seat 21 limits the vertical movement of the juicing cone 26 to establish a minimum gap G between the ridges 25 and the interior of the fruit holder 24 to prevent or reduce the ridges 25 cutting into the fruit rind.

Figure 8:
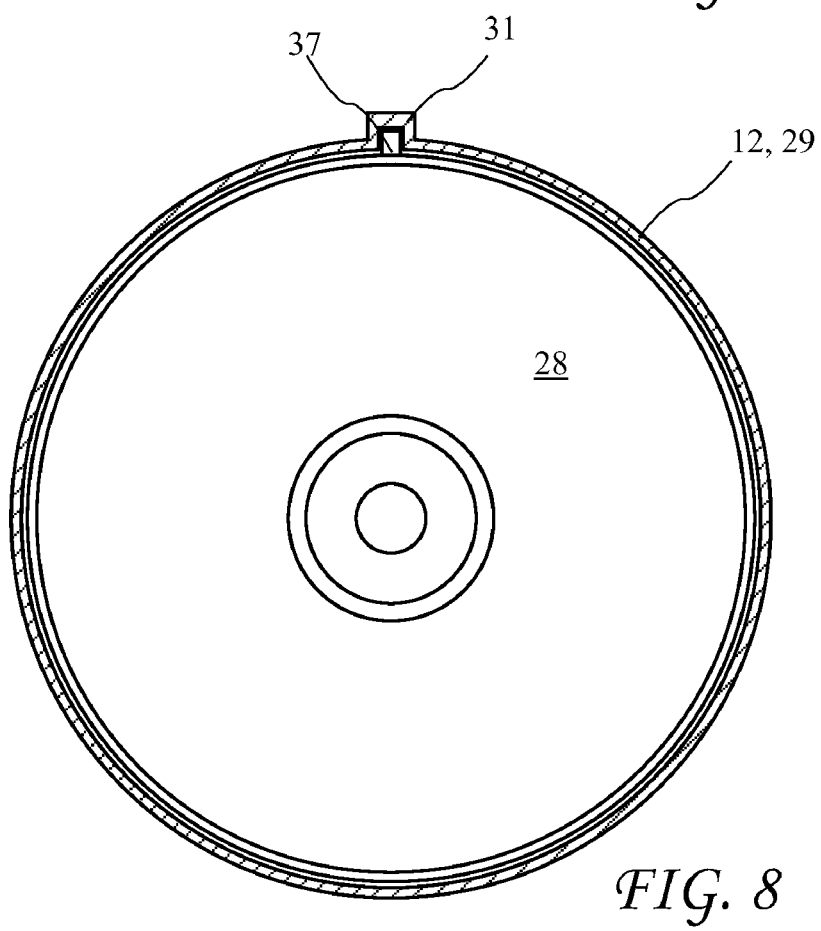
FIG. 8 shows a strainer key and key way.

A strainer key 37 and key way 31 are shown in FIG. 8. The key 37 resides on an edge of the strainer and engages the key way 31 in the lid 12 and/or bowl 29 to prevent rotation of the strainer 28 so that the blades 27 on the bottom of the juicing cone 26 can scrape pulp from the inside of the strainer 28, which pulp might otherwise block the strainer 28.

A side view of the outer column 34 of the center column assembly 30 of the juicer 10 is shown in FIG. 9A, a top view of the outer column 34 is shown in FIG. 9B, a bottom view of the outer column 34 is shown in FIG. 9C, a cross-sectional view of the outer column 34 taken along line 9D-9D of FIG. 9A is shown in FIG. 9D, and a cross-sectional view of the outer column 34 taken along line 9E-9E of FIG. 9B is shown in FIG. 9E. The outer column 34 has a square exterior and square (or any non-round) interior 33 with a flange 35 at the base for attaching to the juicer base 14. The outer column 34 is fixed and neither rotates nor translates. An interior 33 cooperates with the lifting nut 40 to prevent rotation of the lifting nut 40. The outer column 34 includes a ceiling 37 for cooperation with the spring 36. While a preferred outer column 34 has a square interior cross-section, a juicer according to the present invention with an outer column without a square interior is intended to come within the scope of the present invention.

Figure 10B:
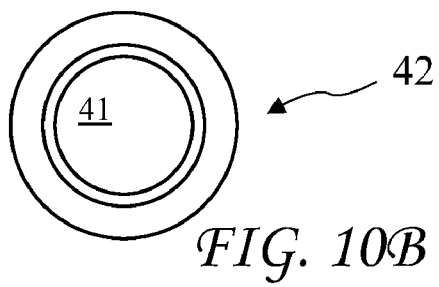
FIG. 10B is a top view of the drive shaft of the center column assembly of the juicer.
Figure 10A:
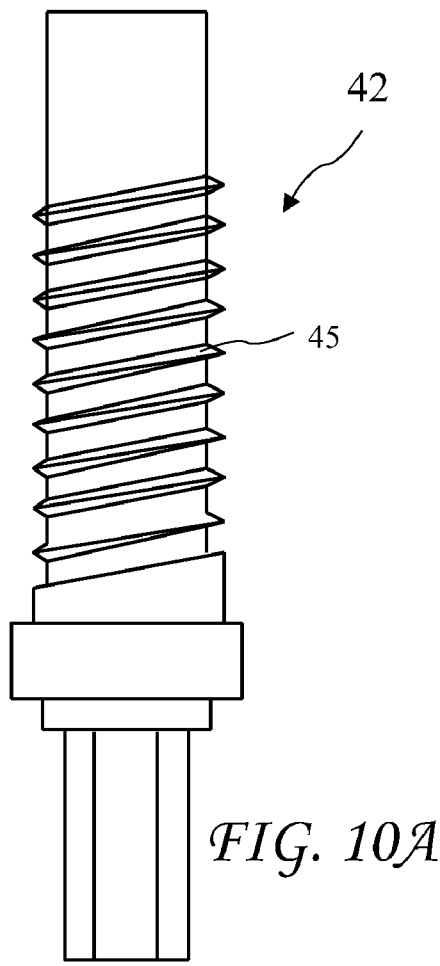
FIG. 10A is a side view of an inner (or drive) shaft, according to the present invention, of the center column of the juicer.
Figure 10C:
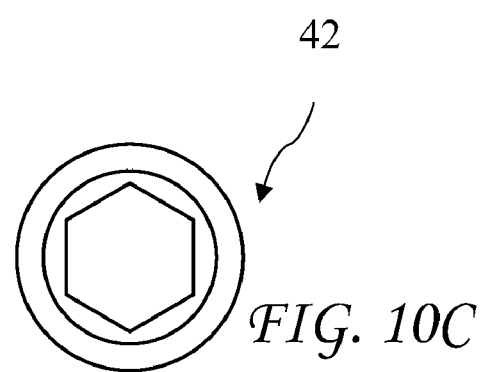
FIG. 10C is a bottom view of the drive shaft of the center column assembly of the juicer.

A side view of a inner shaft 42, according to the present invention, of the center column assembly 30 of the juicer 10 is shown in FIG. 10A, a top view of the inner shaft 42 is shown in FIG. 10B, and a bottom view of the inner shaft 42 is shown in FIG. 10C. The inner shaft 42 is connected to the motor 20 through the gearing assembly 22 (see FIG. 2) and is rotated by the gearing assembly 22 but does not translate. The inner shaft 42 includes threads 45 on a cylindrical exterior for cooperation with a threaded interior 40' of the lifting nut 40 (see FIG. 13B). Because the outer column 34 prevents rotation of the nut 40, rotation of the inner shaft 42 causes the nut 40 to translate vertically.

Figure 11B:
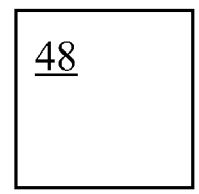
FIG. 11B is a top view of the outer shaft guide of the center column assembly of the juicer.
Figure 11A:
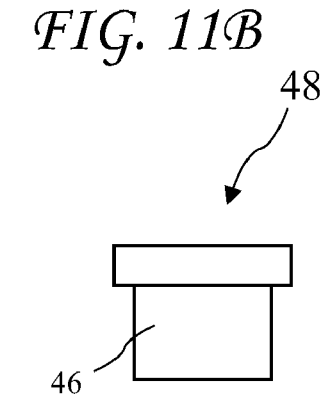
FIG. 11A is a side view of an outer shaft guide, according to the present invention, of the center column assembly of the juicer.
Figure 11C:
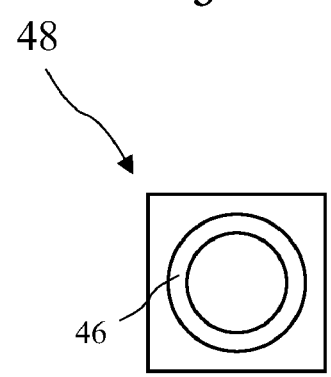
FIG. 11C is a bottom view of the outer shaft guide of the center column assembly of the juicer.

Aside view of an outer shaft guide 48 according to the present invention, of the center column assembly 30 of the juicer 10 is shown in FIG. 11A, a top view of the outer shaft guide 48 is shown in FIG. 11B, and a bottom view of the outer shaft guide 48 is shown in FIG. 11C. The outer shaft guide 48 is fixed to the top of the inner shaft 42 and rotates with the inner shaft. The outer shaft guide 48 may, for example, include a cylindrical portion 46 which is inserted into the top of the inner shaft 42 and thereby attached using threads, glue, key way, non-round shape, or the like, or be formed as a single piece with the inner shaft 42.

Figure 12B:
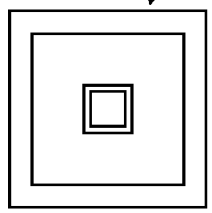
FIG. 12B is a top view of the outer shaft of the center column assembly of the juicer.
Figure 12A:
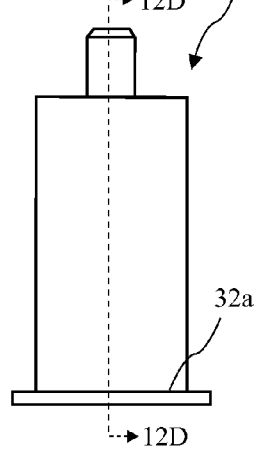
FIG. 12A is a side view of an outer (or driven) shaft, according to the present invention, of the center column assembly of the juicer.
Figure 12D:
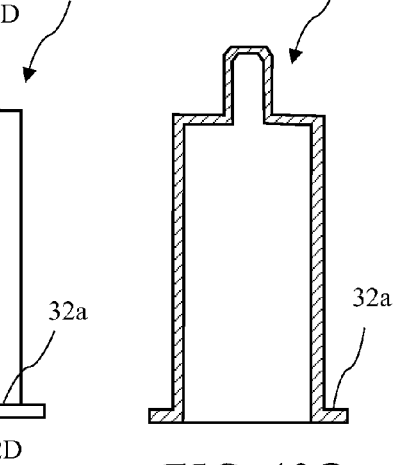
Figure 12C:
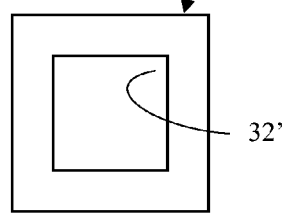
FIG. 12C is a bottom view of the outer shaft of the center column assembly of the juicer.

A side view of an outer (or driven) shaft 32, according to the present invention, of the center column assembly 30 of the juicer 10 is shown in FIG. 12A, a top view of the outer shaft 32 is shown in FIG. 12B, a bottom view of the outer shaft 32 is shown in FIG. 12C, and a side cross-sectional view of the outer shaft 32 taken along line 12D-12D of FIG. 12a is shown in FIG. 12D. The outer shaft 32 resides over the inner shaft 42 and is rotatably coupled to the inner shaft by cooperation of a non-round interior 32' and the outer shaft guide 48, and rotated with the inner shaft, but may advance or retreat vertically with respect to the inner shaft 42. The outer shaft 32 includes a coupling portion 54 for coupling with the juicing cone 26 to lift and rotate the juicing cone 26. A footing 32a reaches out from the bottom of the outer shaft 32 and cooperates with the spring 36 to urge the outer shaft 32 downward when the lifter nut 40 retreats vertically.

Figure 13B:
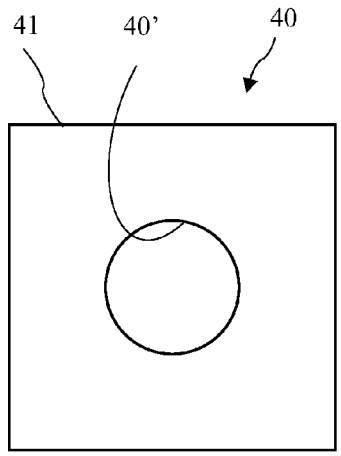
FIG. 13B is a top view of the lift nut of the center column assembly of the juicer.
Figure 13A:
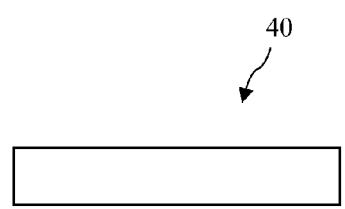
FIG. 13A is a side view of a lift nut, according to the present invention, of the center column assembly of the juicer.

A side view of the lifting nut 40, according to the present invention, of the center column assembly 30 of the juicer 10 is shown in FIG. 13A and a top view of the lifting nut 40 is shown in FIG. 13B. The lifting nut 40 has a threaded interior 40' for cooperating with the threads 45 on the inner shaft 42 and a non-round, and preferably square, exterior 41 for cooperation with the interior of the outer column 34 to prevent rotation of the lifting nut 40. When the inner shaft 42 rotates, the lifting nut 40 advances or retreats vertically to lift or lower the juicing cone 26.

Figure 14:
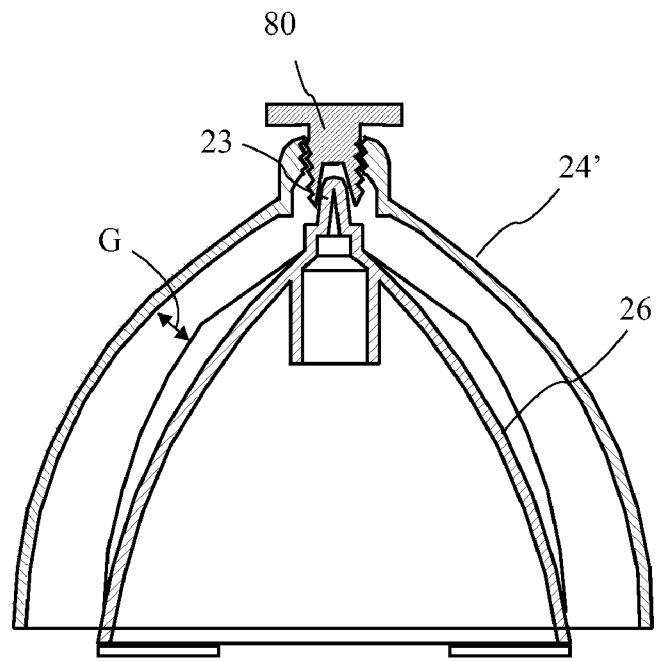
FIG. 14 shows a second fruit holder with an adjustable seat.

A second fruit holder 24' with an adjustable seat 80 is shown in FIG. 14 The adjustable seat 80 preferably includes threads which cooperate with the fruit holder 24' to allow adjustment of the gap G between the juicing cone 26 and the fruit holder 24'.

The gearing assembly 22 (see FIG. 2) according to the present invention is shown in a high speed position in FIG. 15A and in a high torque position in FIG. 15B. The gearing assembly 22 includes a motor 82, switch 84, first gears 94 and 96, second gears 90 and 92, third gears 86 and 88, and a spring 98. The gears 94 and 96 are always engaged. In the relaxed (or UP) position, the spring 98 pushed the gears 90 and 86 upwards, and the gear 90 engages the gear 92 to provide high speed. In the compressed (or DOWN) position, the spring 98 is compressed allowing the gears 90 and 86 to move downward, and the gear 86 engages the gear 88 to provide high torque. The spring 98 further provides a relief from exerting too great a downward force on the gearing assembly 22 or too much upward force on the juicing cone 26. The springs 98 and 36 (see FIG. 6) combine to limit the force exerted on the fruit to preferably between one pound and 50 pounds, and more preferably limit the force exerted on the fruit to between ten pounds and 25 and most preferably limit the force exerted on the fruit to approximately 18 pounds.

The direction of the motor is initially to advance the juicing cone into the fruit, and either after a period of time, or when a preset level of resistance is met by the vertically advancing juicing cone, the direction of the motor reverses to vertically retreat the juicing cone from the fruit.

While the invention herein disclosed has been described by means of specific embodiments and applications thereof, numerous modifications and variations could be made thereto by those skilled in the art without departing from the scope of the invention set forth in the claims.

I claim:

1. An automatic juicer comprising:
   a lid openable to allow fruit to be placed in the juicer;
   a base containing a motor;
   an inner shaft connected to the motor for rotating the inner shaft, the inner shaft having a fixed vertical position;
   an outer shaft rotatably coupled to the inner shaft to rotate with the inner shaft;
   a non-round guide fixed to the inner shaft and cooperating with a non-round interior of the outer shaft to cause the outer shaft to rotate with the inner shaft;
   an outer column fixed to the base;
   a lifting nut threadably engaging the inner shaft and restrained from rotating by the outer column and supporting the outer shaft to advance the outer shaft vertically when the inner shaft rotates;
   a bowl attached to the base; and
   a juicing cone above the bowl and attached to the outer shaft and rotating and advancing vertically with the outer shaft, the juicing cone rotating and pushing into a fruit for releasing juice from the fruit to be caught in the bowl.

2. The juicer of claim 1, further including a strainer between the bowl and the juicing cone.

3. The juicer of claim 2, wherein, the strainer advances vertically with the juicing cone.

4. The juicer of claim 3, wherein the strainer does not rotate.

5. The juicer of claim 4, wherein the juicing cone includes knife edges on a bottom surface for clearing pulp blocking the strainer.

6. The juicer of claim 5, wherein the strainer includes a key and at least one of the bowl and the lid includes a key way for cooperation with the key to prevent rotation of the strainer.

7. The juicer of claim 1, wherein the guide is fixed to the top of the inner shaft.

8. The juicer of claim 1, wherein the guide is integrally formed at the top of the inner shaft.

9. The juicer of claim 1, wherein the outer column includes a ceiling at the top of the outer column and the outer shaft includes an outward reaching footing at the bottom of the outer shaft and a spring resides between the outer column ceiling and the outer shaft footing and the spring vertically urges the outer shaft downward.

10. The juicer of claim 1, wherein inner shaft rotates at a same speed as the outer shaft.

11. The juicer of claim 10, wherein the motor runs in two directions to either vertically advance or vertically retreat the juicing cone.

12. The juicer of claim 11, wherein the direction of the motor is initially to advance the juicing cone into the fruit, and after a period of time the direction of the motor reverses to vertically retreat the juicing cone from the fruit.

13. The juicer of claim 11, wherein the direction of the motor is initially to advance the juicing cone into the fruit, and after a preset resistance to advancing the juicing cone into the fruit is experienced, the direction of the motor reverses to vertically retreat the juicing cone from the fruit.

14. The juicer of claim 11, wherein the vertical advancing of the juicing cone is limited to prevent the juicing cone from cutting into a rind of the fruit.

15. The juicer of claim 1, wherein a fruit holder resides in the lid for holding the fruit and a spring above the fruit holder allows the fruit holder to rise to limit the force of the juicing cone against the fruit.

16. An automatic juicer comprising:
a lid openable to allow fruit to be placed in the juicer;
a base containing a motor and gear assembly;
an outer column fixed to the base and having a non-round interior and an inward reaching ceiling at the top of the outer column;
an inner shaft connected to the motor and gear assembly for rotating the inner shaft, the inner shaft having a fixed vertical position;
an outer shaft residing radially between the inner shaft and the outer column and having a footing reaching outward at the bottom of the outer shaft;
a lifting nut residing under the outer shaft and threadably engaging the inner shaft and having a non-round exterior cooperating with the non-round interior of the outer column to restrict rotation of the lifting nut, the lifting nut to advance the outer shaft vertically when the inner shaft rotates;
a guide fixed to the top of the inner shaft and rotatably coupled to the outer shaft to cause the outer shaft to rotate at the same speed as the inner shaft;
a spring residing between the outer shaft and the outer column and under the outer column ceiling and over the outer shaft footing to urge the outer shaft downward;
a bowl attached to the base; and
a juicing cone above the bowl and attached to the outer shaft and rotating and advancing vertically with the outer shaft, the juicing cone rotating and pushing into a fruit for releasing juice from the fruit to be caught in the bowl.

17. An automatic juicer comprising:
a lid openable to allow fruit to be placed in the juicer;
a base containing a motor and gear assembly;
an outer column fixed to the base and having a square interior and an inward reaching ceiling at the top of the outer column;
an inner shaft connected to the motor and gear assembly for rotating the inner shaft, the inner shaft having a fixed vertical position;
an outer shaft residing radially between the inner shaft and the outer column and having a footing reaching outward at the bottom of the outer shaft;
a lifting nut residing under the outer shaft and threadably engaging the inner shaft and having a square exterior cooperating with the square interior of the outer column to restrict rotation of the lifting nut, the lifting nut to advance the outer shaft vertically when the inner shaft rotates;
a square guide fixed to the top of the inner shaft and rotatably coupled to the outer shaft to cause the outer shaft to rotate at the same speed as the inner shaft;
a spring residing between the outer shaft and the outer column and under the outer column ceiling and over the outer shaft footing to urge the outer shaft downward;
a bowl attached to the base; and
a juicing cone above the bowl and attached to the outer shaft and rotating and advancing vertically with the outer shaft, the juicing cone rotating and pushing into a fruit for releasing juice from the fruit to be caught in the bowl.

18. An automatic juicer comprising:
a lid openable to allow fruit to be placed in the juicer;
a base containing a motor;
an inner shaft connected to the motor for rotating the inner shaft, the inner shaft having a fixed vertical position with respect to driven gears in the base, the driven gears comprising:
a larger driven gear rotationally connected to drive the inner shaft at a low speed;
a smaller driven gear rotationally connected to drive the inner shaft at a high speed; and
a spring supporting the driven gears and limiting a downward force on the gearing assembly and limiting upward force on the juicing cone;
an outer shaft rotatably coupled to the inner shaft to rotate with the inner shaft;
a lifting nut threadably engaging the inner shaft and restrained from rotating and supporting the outer shaft to advance the outer shaft vertically when the inner shaft rotates;
a bowl attached to the base; and
a juicing cone above the bowl and attached to the outer shaft and rotating and advancing vertically with the outer shaft, the juicing cone rotating and pushing into a fruit for releasing juice from the fruit to be caught in the bowl.

19. The automatic juice for claim 18, further including an outer column attached to the base, wherein the outer column including a ceiling at the top of the outer column and the outer shaft includes an outward reaching footing at the bottom of the outer shaft and a spring resides between the outer column ceiling and the outer shaft footing and the spring vertically urges the outer shaft downward.

* * * * *